United States Patent [19]

Murakami et al.

[11] 4,125,521

[45] Nov. 14, 1978

[54] PROCESS FOR PREPARING ALKYD RESINS

[75] Inventors: Yasukazu Murakami; Masayoshi Kubo; Shoji Watanabe, all of Saitama, Japan

[73] Assignee: Daicel Ltd., Sakai, Japan

[21] Appl. No.: 681,738

[22] Filed: Apr. 29, 1976

[30] Foreign Application Priority Data

May 12, 1975 [JP] Japan .................................. 50-56975

[51] Int. Cl.² ............................................. C08G 63/14
[52] U.S. Cl. ..................................... 528/274; 260/16; 260/850; 260/873; 528/296; 528/297
[58] Field of Search ..................................... 260/75 EP

[56] References Cited

U.S. PATENT DOCUMENTS

| | | | |
|---|---|---|---|
| 3,268,483 | 8/1966 | Klootwijk et al. | 260/75 EP |
| 3,275,583 | 9/1966 | Kloos | 260/75 EP X |
| 3,397,255 | 8/1968 | Coats et al. | 260/75 EP X |

*Primary Examiner*—Lucille M. Phynes
*Attorney, Agent, or Firm*—Blanchard, Flynn, Thiel, Boutell & Tanis

[57] ABSTRACT

A process for preparing alkyd resins, characterized by reacting one or a mixture of two or more straight chain, inner epoxyalkanes having 6 to 20 carbon atoms with a cyclic dicarboxylic acid and a polyhydric alcohol.

22 Claims, No Drawings

PROCESS FOR PREPARING ALKYD RESINS

BACKGROUND OF THE INVENTION

1. Field of the Invention

The present invention relates to a process for preparing alkyd resins from straight chain, inner epoxyalkanes, which resins yield a hardened product having an excellent resistance to hydrolysis.

2. Description of the Prior Art

It is well known that alkyd resins are obtained by reacting dicarboxylic acids such as phthalic anhydride with polyhydric alcohols such as glycerol. Alkyd resins, modified with oils, that have the alkyd resin skeleton with fatty acid ester side chains, are used widely for the production of hardenable substances for coatings. However, due to the easily hydrolyzable fatty acid ester bonds in the side chain, the hardened product still has insufficient properties such as poor alkali resistance. As alkyd resins free from chemical instability in the side chain that causes the above-mentioned disadvantage, ther have been known alkyd resins obtained from glycidyl esters of monocarboxylic acids having a side chain in the α-position (Japanese Patent Publication No. 20998/1963), saturated monoalkyl-substituted ethylene glycols (aliphatic 1,2-glycols) (U.S. Pat. No. 3,108,089) and aliphatic 1,2-epoxy compounds (Japanese Patent Publication No. 20360/1966) used in place of the monoglyceride, as a structural unit of the oil-modified alkyd resins. Even though the instability in the side chain, i.e., the disadvantage of the first-mentioned oil-modified alkyd resins, is eliminated by those processes, the resistance of the latter resins to hydrolysis, such as resistance to an alkali or to boiling water, still is unsatisfactory, because the alkyd main chain still contains many primary alkyl ester groups.

SUMMARY OF THE INVENTION

The object of the present invention is to provide a process for reducing the chemical instability of the alkyd main chain by using straight chain inner epoxyalkanes to prepare resins that yield hardened products having the highest resistance to hydrolysis, among alkyd resins having ester bonds.

The straight chain inner epoxyalkanes used in the present invention contain from 6 to 20 carbon atoms in the form of a non-branched straight chain and wherein the epoxy oxygen is bonded to adjacent carbon atoms in any position except the 1,2-positions at both ends of the chain; such as 2,3-epoxyhexane, 3,4-epoxyoctane, 3,4-epoxydecane, 2,3-epoxyundecane, 3,4-epoxyundecane, 5,6-epoxydodecane, 3,4-epoxytridecane, 5,6-epoxytetradecane, 4,5-epoxyoctadecane and 8,9-epoxyeicosane. These epoxyalkanes have the following formula:

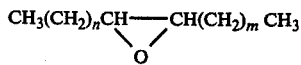

wherein each of $n$ and $m$ is from zero to 16, with the proviso that the sum of $n$ plus $m$ is from 2 to 16. Although straight chain inner epoxyalkanes having any carbon atom number in the above range of 6 to 20 carbons can be used, those containing 8 to 14 carbon atoms are preferred for obtaining particularly excellent alkyd resins.

The inner epoxyalkanes are obtained by, for example, converting the corresponding n-paraffins into straight chain inner olefins by a catalytic dehydrogenation reaction and then subjecting the olefins to an epoxidation reaction with an organic peroxide such as peracetic acid or perbenzoic acid or hydrogen peroxide.

The straight chain inner epoxyalkanes can be used singly or in the form of a mixture of two or more of said epoxyalkanes. Particularly, mixtures prepared by the abovedescribed process starting with an n-paraffin mixture separated from petroleum distillate fractions by a clathrate inclusion process can be used on an industrial scale at a low cost.

The inner epoxyalkanes can be used as the sole epoxy component in the alkyd resin-formation process as a matter of course and, in addition, they can also be used together with from zero to 30 weight percent of 1,2-epoxyalkanes having from 6 to 20 carbon atoms such as 1,2-epoxydodecane and glycidyl esters of tertiary aliphatic monocarboxylic acids having from 5 to 20 carbon atoms and having a side chain in the α-position, for example Cardura E(trademark of Shell company), unless the characteristic feature of the present invention is damaged thereby. The inner epoxyalkanes and/or the 1,2-epoxides used together therewith may be in the form of their functional derivatives such as glycols and glycol esters, so lone as the object of the present invention, i.e. the synthesis of alkyd resins, can be achieved.

If more than 30 percent by weight of 1,2-epoxy compounds is used to replace the inner epoxy compounds, the obtained alkyd resin is damaged in its resistance to water and hydrolysis. Glycols and glycol esters used to replace a part of the epoxide are inferior in their reactivity and therefore they must not be used in more than an amount such that the synthesis of alkyd resins is suppressed.

The other starting materials of the present invention, i.e. the cyclic dicarboxylic acids and polyhydric alcohols, can be selected from among the conventional substances known as starting materials for the preparation of alkyd resins. Namely, as the cyclic dicarboxylic acids, dicarboxylic acids and anhydrides thereof having 8 to 12 carbon atoms such as phthalic anhydride, isophthalic acid and terephthalic acid are most typically used, and in addition, tetrahydrophthalic acid, naphthalene dicarboxylic acid and anhydrides thereof can be used. Further, up to 20 percent by weight of the cyclic dicarboxylic acid can be replaced with straight chain dicarboxylic acids having 4 to 10 carbon atoms such as adipic acid and maleic acid and anhydrides thereof, as well as cyclic tricarboxylic acids such as trimellitic acid and anhydrides thereof. The typical polyhydric alcohols are aliphatic and cycloaliphatic alcohols having 2 to 10 carbon atoms, including trihydric alcohols such as glycerol, trimethylolethane and trimethylolpropane; tetrahydric or higher polyhydric alcohols such as pentaerythritol and diglycerol; and dihydric alcohols such as ethylene glycol, propylene glycol, diethylene glycol and neopentyl glycol.

The molar ratios of the three kinds of starting materials of the present invention can be selected on the basis of proportions usually employed in recipes for preparing alkyd resins. The amount of the epoxyalkane is a factor for determining the proportion of side chain alkyl groups of the alkyd resin, which in turn exerts an influence of the properties of the hardened coatings. The epoxyalkanes are used in the present invention in an amount usually in the range of 10 to 50 wt.% based on the weight of the resulting alkyd resin.

As to the proportions of the cyclic dicarboxylic acid used as the source of carboxyl groups, and the polyhydric alcohol and the epoxide used as sources of hydroxyl groups, the starting materials are selected in such amounts that there is provided an excess of hydroxyl groups in relation to the carboxyl groups so as to obtain an alkyd resin having a low acid value and to insure the presence of free hydroxyl groups for a chemical hardening reaction with an amino resin or the like. It is preferred that the ratio of hydroxyl groups/carboxyl groups is 1.0:1 to about 1.6:1, preferably 1.2:1 to 1.4:1. The inner epoxyalkane is from 20 to 95 weight percent of the total amount of the alcohol component.

An example of the reaction according to the present invention is shown partially by the following reaction scheme:

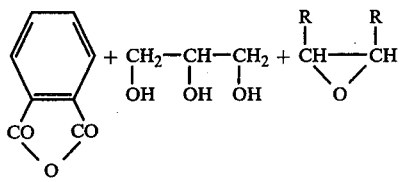

wherein R and R' each is a straight chain alkyl group,

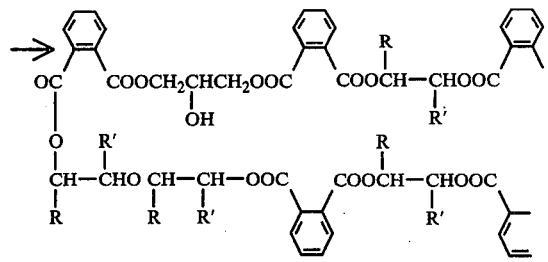

The above reaction is carried out at a temperature in the range of 80° to 250° C. In this reaction, the lower the temperature, the more excellent is the hue of the resin. It is preferred to add the straight chain inner epoxyalkane slowly to the reaction mixture at a temperature in the range of 80° to 160° C., preferably 90° to 140° C., to prevent rapid increase in the temperature and thereby advantageously to lower the hue of the resin.

In an example of the synthesis of the alkyd resin by reacting a straight chain inner epoxyalkane with a cyclic dicarboxylic acid (hereinafter referred to as "acid") and a polyhydric alcohol (hereinafter referred to as "polyol"), one mole of the acid and 1.1 to 1.4 moles of the polyol are charged first, the esterification reaction is carried out in the presence of an azeotropic solvent such as xylene at a temperature of 140° to 250° C. to form a polyester prepolymer having terminal hydroxyl groups, then additional acid is added thereto, thereafter, the straight chain inner epoxyalkane is added slowly in an amount equivalent to the acid at a temperature in the range of 80° to 160° C., preferably 90° to 150° C., with agitation, to effect the reaction, and the agitation is continued with heating to a temperature in the range of 140° to 240° C. until the reaction product has an acid value of 2 to 10, preferably 3 to 5. In this reaction, an azeotropic solvent such as xylene can be added in a quantity of 5 to 20 wt.%, based on the weight of the reaction mixture, to promote the dehydrogenation/esterification reaction.

Another example of the reaction of the above three components comprises adding slowly the straight chain inner epoxyalkane to a mixture of the polyol and the acid, with agitation under heating to 100° to 150° C. to effect the reaction, adding 5 to 40 wt.% of an azeotropic solvent such as xylene thereto and heating the mixture to 140° to 250° C. with agitation to carry out the esterification reaction further, while water is removed from the reaction system, thereby obtaining a resin having an acid value of 3 to 10. In those reactions, 0.01 to 5 wt.%, preferably 0.05 to 1.5 wt.%, based on the inner epoxyalkane, of a conventional catalyst for effecting a ring-opening reaction between an organic acid and an epoxide and an esterification between an alcohol and a dibasic anhydride can be used as a catalyst for promoting the reaction of the straight chain inner epoxyalkane and the acid. For instance, there can be used an amine (particularly tertiary amines), a quaternary ammonium salt, a phosphine compound substituted with an aliphatic or aromatic group, or boron trifluoride (boron trifluoride per se or a complex thereof such as with an amine or an ether). For obtaining a resin having a particularly low hue, it is desirable to use a quaternary ammonium salt such as benzyltriethylammonium chloride, benzyltrimethylammonium chloride, tetramethylammonium chloride, benzyltriethylammonium bromide, tetramethylammonium hydroxide and benzyltrimethylammonium hydroxide.

Although the alkyd resins prepared according to the present invention are apt to be colored during the preparation steps, the hue of the products can be improved greatly by adding 0.5 to 1 wt.%, based on the weight of the resin, of an oxidizing agent such as hydrogen peroxide. In such a case, it is preferred to effect the addition of the oxidizing agent at a temperature in the range of 80° to 150° C. after a hydrocarbon such as xylene is added to the resin to dilute the same into a 50 to 80 wt.% solution.

The alkyd resins thus obtained are freely compatible with melamine resins, urea resins, guanamine resins, thermosetting acrylic resins, cellulose nitrate, etc. to produce excellent paint compositions. For example, by forming a baking melamine-alkyd paint from the alkyd resin and an amino resin and then heating the same to 80° to 200° C., a hardened product of excellent resistance to weather, water, acids, alkalis and solvents and also excellent gloss and hardness can be obtained. Particularly, the resistance of the product to hydrolysis such as the resistance to water, boiling water and an alkali is superior to that of a hardened product prepared from an alkyd resin obtained from a 1,2-epoxide or 1,2-glycol which has heretofore been considered to be most excellent in this field of alkyd resins.

Furthermore, a lacquer which is obtained from the above mentioned alkyd resin, nitrocellulose and optionally an additive such as an acrylic resin, melamine resin, epoxy resin, maleic rosinic resin (rosin maleate), a plasticizer, a solvent and a pigment can be employed for wood-working, metal-working and repair of cars. The obtained coating film possesses improved resistance to weather and chemicals and improved strength, compared with a conventional, oil-modified alkyd resin.

The reason why this excellent effect is obtained according to the present invention is considered to be as follows. Polyesters prepared in the prior art from glycidyl esters of monocarboxylic acids having a side chain in the α-position, or 1,2-epoxy compounds, and said acids, have ester groups joined to primary carbon atoms and it is considered that the polyesters can be easily attacked chemically at this point. On the other hand, in the polyesters prepared from the straight chain inner epoxyalkanes and the acids, according to the process of the present invention, all carbon atoms from the inner epoxyalkanes are secondary carbon atoms having an alkyl substituent and it is considered that it is difficult to chemically attack ester groups joined thereto due to steric hindrance. Of course, the main chain contains ester groups joined to primary carbon atoms derived from the polyol but, as a whole, the weak points of the polyester structure are negligible. Thus, the effect of resistance to hydrolysis is improved.

Another characteristic feature of the invention is that the inner epoxyalkanes used are straight chain compounds. Due to the straight chain structure, tertiary carbon atoms are excluded from the structure of the resulting alkyd resins. If tertiary carbon atoms are contained therein, this leads to an elimination reaction from the adjacent carbon atom or autoxidation thereby disadvantageously causing deterioration, such as coloring and reduction in molecular weight. According to the present invention, it is possible to prepare alkyd resins that yield hardened products of improved resistance to hydrolysis without encountering problems such as marked coloring, by using straight chain inner epoxyalkanes selectively.

The present invention will be further described by reference to the following illustrative examples.

EXAMPLE 1

A mixture of 24 g of glycerol, 30 g of phthalic anhydride and 6 g of xylene was heated to 150° to 180° C. under a nitrogen gas stream. The water produced by the reaction was removed from the reaction system by azeotropy with xylene. The reaction was continued until 3.6 g of water were formed. To the thus-prepared resin there was further added 35.5 g of phthalic anhydride, 48.6 g of a mixture of straight chain inner epoxyalkanes having 11 to 14 carbon atoms (epoxy equivalent: 203) and 0.5 g of triethylbenzylammonium chloride. The mixture was heated to 120° C. for 3 hours and then to 185° C. for 4 hours with agitation to obtain a resin having an acid value of 3.4. After dilution of the resin with xylene to obtain a 70 wt.% solution, the solution exhibited a Gardner chromaticity of 3 and a Gardner viscosity of $Z_1$.

The resin was compatible with melamine resins, urea resins, nitrocellulose, acrylic resins, ect.

The resin solution was blended with a butylated melamine resin (Superbackamine L-105-60; a product of Dai-Nihon Ink Co., Ltd.) and rutile-type titanium oxide (Tipaque R-820; a product of Ishihara Sangyo Co., Ltd.) in a solids weight proportion of 42 : 18 : 40 and the entirety was blended in a ball mill for 24 hours to obtain a white enamel aminoalkyd paint. The paint was applied to a thin mild steel plate and tin plate. After baking at 120° C. for 30 minutes, coatings of 28µ thickness were obtained. The properties of the coatings are shown in Table 1. The coatings exhibited very excellent resistance to water, acids, alkalis and weather.

EXAMPLE 2

A mixture of 30 g of glycerol, 37.0 g of phthalic anhydride and 6.5 g of xylene was heated to 140° to 200° C. with agitation under a nitrogen gas stream for 7 hours. The esterification reaction was continued till 4.5 g of water were formed. To the thus-obtained polyester resin there was further added 52 g of phthalic anhydride, 54 g of a mixture of straight chain inner epoxyalkanes having 9 to 11 carbon atoms (epoxy equivalent: 167) and 0.54 g of benzyldimethylamine. The mixture was heated to 110° C. for 5 hours and then to 180° C. for 3 hours with agitation to obtain a resin having an acid value of 4.2. After dilution of the resin with xylene to obtain a 70 wt.% solution, the solution exhibited a Gardner chromaticity of 3 and a Gardner viscosity of $Z_3$-$Z_4$.

The properties of coatings obtained from the resin solution in the same manner as described in Example 1 are shown in Table 1.

EXAMPLE 3

A mixture of 34.5 g of glycerol, 37 g of phthalic anhydride and 7.3 g of adipic acid was heated to 140° to 200° C., with agitation, under a nitrogen gas stream, for seven hours. The esterification reaction was continued until 5.4 g of water were formed. To the thus-obtained polyester resin there were further added 35.5 g of phthalic anhydride, 60 g of a straight chain inner epoxyalkane mixture having 11–14 carbon atoms (epoxy equivalent: 203) and 0.6 g of triethylbenzylammonium bromide. The mixture was heated to 110° C. for 3 hours and then to 180° C. for 5 hours with agitation to obtain a resin having an acid value of 3.7. After dilution of the resin with xylene to obtain 70 wt.% solution, the solution exhibited a Gardner chromaticity of 3.

The properties of coatings obtained from the resin solution in the same manner as described in Example 1 are shown in Table 1.

EXAMPLE 4

A mixture of 14.7 g of glycerol, 25.0 g of neopentylglycol, 106 g of phthalic anhydride, 82 g of a straight chain inner epoxyalkane mixture having 11 to 14 carbon atoms (epoxy equivalent: 203), 0.8 g of triethylbenzylammonium chloride and 20 g of xylene was heated to 110° to 180° C., with stirring, for ten hours to form 5.8 g of water and a resin having an acid value of 3.6. After dilution of the resin with xylene to obtain a 70 wt.% solution, the solution exhibited a Gardner chromaticity of 3 and a Gardner viscosity of $Z_3$-$Z_4$.

The properties of coatings obtained from the resin in the same manner as described in Example 1 are shown in Table 1.

COMPARATIVE EXAMPLE 1

A mixture of 30 g of glycerol, 37 g of phthalic anhydride and 6.5 g of xylene was heated to 150° to 180° C., with stirring, under a nitrogen gas stream, for 7 hours. The esterification reaction was continued until 4.5 g of water were formed. To the thus-obtained polyester resin there was further added 44 g of phthalic anhydride, 60 g of a mixture of 1,2-olefin epoxides of 12 and 14 carbon atoms (epoxy equivalent: 203) and 0.6 g of benzyltriethylammonium chloride. The mixture was heated to 150° C. for four hours and then to 180° C. for 8 hours, with stirring, to obtain a resin having an acid value of 3.8. After dilution of the resin with xylene to obtain a 70 wt.% solution, the solution exhibited a Gardner chromaticity of less than 1. The properties of baked coatings obtained from the resin solution in the same manner as described in Example 1 are shown in Table 1.

The coatings obtained in this comparative example were inferior to the coating obtained from the resins prepared from the straight chain inner epoxyalkanes in Examples 1–3 with respect to resistance to water and alkalis.

Table 1

|  | Ex. 1 | Ex. 2 | Ex. 3 | Ex. 4 | Comp. Ex. 1 |
|---|---|---|---|---|---|
| Gloss (60° mirror plane reflection) | 92 | 93 | 90 | 92 | 92 |
| Gloss after treatment with weather meter for 200 hours | 92 | 92 | 90 | 91 | 91 |
| Pencil hardness | 3H | H | 2H | 2H | H |
| Adhesiveness (crosscut) | ◎ | ◎ | ◎ | ◎ | ◎ |
| Impact resistance (1 kg.cm) | 50< | 50< | 50< | 50< | 50< |
| Flexural resistance (φ, 2mm) | ◯ | ◎ | ◎ | ◎ | ◎ |
| Ericksen test (mm) | 8.4 | 10.3 | 9.6 | 10.0 | 11.1 |
| Water resistance (40° C, 24 hrs.) | ◯ | ◯ | ◯ | ◎ | Δ |
| Boiling water resistance (one hr.) | ◯ | ◯ | ◯ | ◎ | Δ |
| NaOH resistance (5% aqueous solution, 20° C, 24 hrs.) | ◯ | ◎ | ◯ | ◯ | ◯ |
| Sulfuric acid resistance (5% aqueous solution, 20° C, 24 hrs.) | ◎ | ◎ | ◎ | ◎ | ◎ |
| Gasoline resistance (20° C, 24 hrs.) | ◎ | ◎ | ◎ | ◎ | ◎ |

(Note)
The tests of the properties of the coatings were carried out according to JIS K 5400. The evaluation of the hardened products obtained from the alkyd resins including oil-modified alkyl resins and oil-free alkyd resins was effected by establishing five ranks of progressively decreasing quality, namely, ◎, ◯, Δ, X and XX, rank ◎ being the most excellent and rank XX being the worst.

EXAMPLE 5

A mixture of 17.3 g of an alkyd resin solution prepared in Example 4, 16.4 g of ½ second nitrocellulose (25% of isopropanol included, by Daicel Ltd.) and 5.8 g of dibutyl phthalate was diluted with a lacquer thinner to obtain a 45 wt.% solution. The obtained nitrocellulose lacquer was coated onto a steel plate and was dried at room temperature for 5 days. The properties of the coated film thus-obtained are shown as follows:

| Status of film | very good |
|---|---|
| Writing test | very good |
| Water-proofness at 25° C for 150 hours | good |
| Flexural resistance (2 mm) | unchanged |

EXAMPLE 6

A mixture of 80 g of an alkyd resin solution prepared in Example 4, 100 g of nitrocellulose (25% of isopropanol included, by Daicel Ltd.), 20 g of maleic rosinic resin (rosin maleate) (Beckacite 1111 of Dai-Nihon Ink Co., Ltd.), and 30 g of dibutylphthalate as a plasticizer, was diluted with a lacquer thinner to obtain the concentration of 30 wt.%. It was further diluted with a lacquer thinner to obtain a falling velocity of 20 seconds with a Ford cup at 20° C. and the solution was coated with a spraying gun onto a polyester toilet plate, of about 100 micron thickness. The obtained film had a very good appearance. This film was subjected 10 times to a cyclic test in which it was allowed to stand at 50° C. for 2 hours and then at −20° C. for 2 hours. As a result, there was not found any cracking and the like in the film.

EXAMPLE 7

Twenty-two grams of the alkyd resin prepared in Example 4 was blended with 70 g of a thermosetting acrylic resin (Acrydic C-102 of Dai-Nihon Ink Co., Ltd.), 18 g of a melamine resin (Superbeckamine J-820 of Dai-Nihon Ink Co., Ltd.) and 90 g of titanium oxide (Tipaque R-820 of Ishihara Sangyo Co., Ltd.) to obtain a white enamel. The white enamel was coated on a metal plate, and was heated up to 150° C. for 30 minutes. The properties of the film thus-obtained are shown as follows:

| Status of coated film | good |
|---|---|
| Ericksen test (mm) | 8.5 |
| Immersing in water for 150 hours | unchanged |
| Gloss (60°) | 89 percent |

The embodiments of the invention in which an exclusive property or privilege is claimed are defined as follows:

1. A process for preparing an alkyd resin having a low acid number which comprises: mixing and reacting one or a mixture of alkyd resin-forming cyclic dicarboxylic acids, or anhydrides thereof, with one or a mixture of alkyd resin-forming polyhydric alcohols, and with one or a mixtue of alkyd resin-forming inner expoxyalkanes having the formula

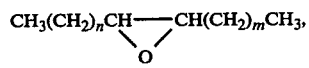

wherein each of n and m is from zero to 16 and the sum of n plus m is from 2 to 16, the reaction mixture containing an excess of hydroxyl groups supplied by the polyhydric alcohol component and the epoxyalkane component in relation to the carboxyl groups supplied by the dicarboxylic acid component and the amount of the epoxyalkane component being from about 10 to about 50 percent by weight, based on the weight of the alkyd resin product, the reacting being carried out in the presence of from 0.01 to 5.0 percent by weight, based on the weight of said inner epoxyalkane, of a quaternary ammonium salt catalyst effective for promoting reaction between said acid and said inner expoxyalkane, the reaction being carried out at a temperature and for a time effective to form an alkyd resin having an acid number of from 2 to 10.

2. A process as claimed in claim 1 in which the sum of n plus m in the epoxyalkane component is from 4 to 10.

3. A process as claimed in claim 1 in which the reaction mixture contains up to 30 percent by weight of alkyd resin-forming 1,2-epoxy compounds, or alkyd resin-forming glycidyl esters of monocarboxylic acids, or mixtures thereof, based on the sum of the weight thereof and the weight of said inner epoxyalkane component.

4. A process as claimed in claim 1 in which said cyclic dicarboxylic acid or anhydride thereof has 8 to 12 carbon atoms and said polyhydric alcohol is an aliphatic or cycloaliphatic polyhydric alcohol having 2 to 10 carbon atoms.

5. A process as claimed in claim 4 in which the reaction mixture contains up to 20 percent by weight of straight chain dicarboxylic acids or anhydrides thereof, or cyclic tricarboxylic acids or anhydrides, or mixtures thereof, based on the sum of the weight thereof and the weight of the cyclic dicarboxylic acid component.

6. A process as claimed in claim 1, which comprises heating within a temperature range of from about 80° C. to about 250° C., for a time sufficient to obtain a reaction product having an acid number of less than 10, a mixture of said cyclic dicarboxylic acid component, said polyhydric alcohol component and said inner epoxyalkane component, wherein the ratio of hydroxyl groups to carboxyl groups in the reaction mixture is from about 1.0:1 to about 1.6:1, and the amount of said inner expoxyalkane component is from 20 to 95 weight percent, based on the sum of the weights of said polyhydric alcohol component and said inner epoxyalkane component.

7. A process as claimed in claim 6 in which said cyclic dicarboxylic acid component is selected from the group consisting of phthalic acid, isophthalic acid, terephthalic acid, tetrahydrophthalic acid, naphthalene dicarboxylic acid and anhydrides thereof and said polyhydric alcohol component is selected from the group consisting of glycerol, trimethylolethane, trimethylolpropane, pentaerythritol, diglycerol, ethylene glycol, propylene glycol, diethylene glycol and neopentyl glycol.

8. An alkyd resin prepared by the process of claim 1.

9. A process according to claim 1 in which said quaternary ammonium salt is selected from the group consisting of benzyltriethylammonium chloride, benzyltrimethylammonium chloride, tetramethylammonium chloride, benzyltriethylammonium bromide, tetramethylammonium hydroxide and benzyltrimethylammonium hydroxide.

10. A process according to claim 9, in which, in a first step, said dicarboxylic acid and said polyhydric alcohol are mixed at a molar ratio of from 1/1.1 to 1/1.4, at a temperature of 140° to 250° C. to form a polyester prepolymer having terminal hydroxyl groups, and then, in a second step, additional dicarboxylic acid, an equivalent amount of said epoxyalkane and said quaternary ammonium salt catalyst are added to the reaction product of said first step, at a temperature of from 80° to 150° C. with agitation and continuing agitation with heating to a temperature of from 140° to 240° C. until an alkyd resin product having an acid value of 2 to 10 is formed.

11. A process according to claim 9 in which said epoxyalkane is slowly added to a mixture of said dicarboxylic acid and said polyhydric alcohol with agitation at 100° to 150° C., and agitation is continued while heating the reaction mixture to 140° to 250° C. until an alkyd resin product having an acid value of 3 to 10 is obtained.

12. A process for preparing an alkyd resin having a low acid number which comprises: mixing and reacting one or a mixture of alkyd resin-forming cyclic dicarboxylic acids, or anhydrides thereof, with one or a mixture of alkyd resin-forming polyhydric alcohols, and with one or a mixture of alkyd resin-forming inner epoxyalkanes having the formula

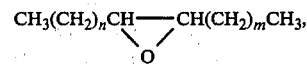

wherein each of $n$ and $m$ is from zero to 16 and the sum of $n$ plus $m$ is from 2 to 16, the reaction mixture containing an excess of hydroxyl groups supplied by the polyhydric alcohol component and the epoxyalkane component in relation to the carboxyl groups supplied by the dicarboxylic acid component and the amount of the epoxyalkane component being from about 10 to about 50 percent by weight, based on the weight of the alkyd resin product, the reaction being carried out in the presence of from 0.01 to 5.0 percent by weight, based on the weight of said inner epoxyalkane, of a tertiary amine catalyst effective for promoting reaction between said acid and said inner epoxyalkane, the reaction being carried out at a temperature and for a time effective for forming an alkyd resin having an acid number of from 2 to 10.

13. A process as claimed in claim 12 in which the sum of $n$ plus $m$ in the epoxyalkane component is from 4 to 10.

14. A process as claimed in claim 12 in which the reaction mixture contains up to 30 percent by weight of alkyd resin-forming 1,2-epoxy compounds, or alkyd resin-forming glycidyl esters of monocarboxylic acids, or mixtures thereof, based on the sum of the weight thereof and the weight of said inner epoxyalkane component.

15. A process as claimed in claim 12 in which said cyclic dicarboxylic acid or anhydride thereof has 8 to 12 carbon atoms and said polyhydric alcohol is an aliphatic or cycloaliphatic polyhydric alcohol having 2 to 10 carbon atoms.

16. A process as claimed in claim 15 in which the reaction mixture contains up to 20 percent by weight of straight chain dicarboxylic acids or anhydrides thereof, or cyclic tricarboxylic acids or anhydrides, or mixtures thereof, based on the sum of the weight thereof and the weight of the cyclic dicarboxylic acid component.

17. A process as claimed in claim 12, which comprises heating within a temperature range of from about 80° C. to about 250° C., for a time sufficient to obtain a reaction product having an acid number of less than 10, a mixture of said cyclic dicarboxylic acid component, said polyhydric alcohol component and said inner epoxyalkane component, wherein the ratio of hydroxyl groups to carboxyl groups in the reaction mixture is from about 1.0:1 to about 1.6:1, and the amount of said inner epoxyalkane component is from 20 to 95 weight percent, based on the sum of the weights of said polyhydric alcohol component and said inner epoxyalkane component.

18. A process as claimed in claim 17 in which said cyclic dicarboxylic acid component is selected from the group consisting of phthalic acid, isophthalic acid, terephthalic acid, tetrahydrophthalic acid, naphthalene dicarboxylic acid and anhydrides thereof and said polyhydric alcohol component is selected from the group consisting of glycerol, trimethylolethane, trimethylolpropane, pentaerythritol, diglycerol, ethylene glycol, propylene glycol, diethylene glycol and neopentyl glycol.

19. An alkyd resin prepared by the process of claim 12.

20. A process according to claim 12 in which said tertiary amine is benzyldimethylamine.

21. A process according to claim 12, in which, in said first step, said dicarboxylic acid and said polyhydric alcohol are mixed at a molar ratio of from 1/1.1 to 1/1.4, at a temperature of 140° to 250° C. to form a polyester prepolymer having terminal hydroxy groups, and then, in a second step, additional dicarboxylic acid, an equivalent amount of said epoxyalkane and said tertiary amine catalyst are added to the reaction product of said first step, at a temperature of from 80 to 160° C. with agitation and continuing agitation with heating to a temperature of from 140° to 240° C. until an alkyd resin product having an acid value of 2 to 10 is formed.

22. A process according to claim 12 in which said epoxyalkane is slowly added to a mixture of said dicarboxylic acid and said polyhydric alcohol with agitation at 100° to 150° C., and agitation is continued while heating the reaction mixture to 140° to 250° C. until an alkyd resin product having an acid value of 3 to 10 is obtained.

* * * * *

UNITED STATES PATENT AND TRADEMARK OFFICE
CERTIFICATE OF CORRECTION

PATENT NO. : 4 125 521
DATED : November 14, 1978
INVENTOR(S) : Yasukazu Murakama et al It is certified that error appears in the above-identified patent and that said Letters Patent are hereby corrected as shown below:

Column 8, line 34; change "mixtue" to ---mixture---.

Column 8, line 34; change "expoxyal-" to ---epoxyal- ---.

Column 8, line 49; change "reacting" to ---reaction---.

Column 8, line 53; change "expoxyalkane" to ---epoxyalkane---.

Column 9, line 19; change "expoxyalkane" to ---epoxyalkane---.

Column 9, line 40; change "monium" to ---onium---.

Signed and Sealed this

Thirteenth Day of March 1979

[SEAL]

Attest:

RUTH C. MASON
Attesting Officer

DONALD W. BANNER
Commissioner of Patents and Trademarks